(12) United States Patent
Bowers et al.

(10) Patent No.: US 8,813,234 B1
(45) Date of Patent: Aug. 19, 2014

(54) GRAPH-BASED APPROACH TO DETERRING PERSISTENT SECURITY THREATS

(75) Inventors: Kevin D. Bowers, Melrose, MA (US); Marten E. van Dijk, Somerville, MA (US); Ari Juels, Brookline, MA (US); Alina M. Oprea, Arlington, MA (US); Ronald L. Rivest, Arlington, MA (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 486 days.

(21) Appl. No.: 13/171,759

(22) Filed: Jun. 29, 2011

(51) Int. Cl.
*G06F 21/00* (2013.01)

(52) U.S. Cl.
USPC .......................................................... 726/25

(58) Field of Classification Search
CPC ...... G06F 21/55; G06F 21/552; G06F 21/604
USPC ..................................................... 726/25, 26
See application file for complete search history.

(56) References Cited

U.S. PATENT DOCUMENTS

| | | | | |
|---|---|---|---|---|
| 7,013,395 | B1 * | 3/2006 | Swiler et al. | 726/25 |
| 7,627,900 | B1 * | 12/2009 | Noel et al. | 726/25 |
| 2004/0049693 | A1 * | 3/2004 | Douglas | 713/200 |
| 2004/0117658 | A1 * | 6/2004 | Klaes | 713/201 |
| 2005/0193430 | A1 * | 9/2005 | Cohen et al. | 726/25 |
| 2006/0085858 | A1 * | 4/2006 | Noel et al. | 726/25 |
| 2006/0143712 | A1 * | 6/2006 | Grosse et al. | 726/24 |
| 2009/0125902 | A1 * | 5/2009 | Ghosh et al. | 718/1 |
| 2013/0212709 | A1 * | 8/2013 | Tucker | 726/29 |

OTHER PUBLICATIONS

Feng Chen; Ri Tu; Yi Zhang; Jinshu Su, "Two Scalable Analyses of Compact Attack Graphs for Defending Network Security," Networks Security, Wireless Communications and Trusted Computing, 2009. NSWCTC '09. International Conference on , vol. 1, No., pp. 627, 632, 25-26 (IEEE Apr. 2009).*

Rinku Dewri, Nayot Poolsappasit, Indrajit Ray, and Darrell Whitley. 2007. Optimal security hardening using multi-objective optimization on attack tree models of networks. In Proceedings of the 14th ACM conference on Computer and communications security (CCS '07). ACM, New York, NY, USA, 204-213 (ACM 2007).*

Lingyu Wang, Steven Noel, Sushil Jajodia, Minimum-cost network hardening using attack graphs, Computer Communications, vol. 29, Issue 18, Nov. 28, 2006, pp. 3812-3824 (SCienceDirect 2006).*

U.S. Appl. No. 12/982,288 filed in the name of J.P. Field et al. on Dec. 30, 2010 and entitled "Distributed Security Information and Event Management System with Application-Injected Remote Components."

* cited by examiner

*Primary Examiner* — Jung Kim
*Assistant Examiner* — Theodore Parsons
(74) *Attorney, Agent, or Firm* — Ryan, Mason & Lewis, LLP

(57) ABSTRACT

A processing device comprises a processor coupled to a memory and implements a graph-based approach to protection of a system comprising information technology infrastructure from a persistent security threat. Attack-escalation states of the persistent security threat are assigned to respective nodes in a graph, and defensive costs for preventing transitions between pairs of the nodes are assigned to respective edges in the graph. A minimum cut of the graph is computed, and a defensive strategy is determined based on the minimum cut. The system comprising information technology infrastructure subject to the persistent security threat is configured in accordance with the defensive strategy in order to deter the persistent security threat.

20 Claims, 4 Drawing Sheets

GRAPH-BASED APPROACH TO DETERRING PERSISTENT SECURITY THREATS

FIELD OF THE INVENTION

The present invention relates generally to the field of information processing, and more particularly to protecting information technology infrastructure from security threats.

BACKGROUND OF THE INVENTION

Information technology infrastructure of a company, organization or other enterprise is continuously subject to a wide variety of security threats. For example, advanced persistent threats (APTs) represent a very sophisticated class of attacks against an enterprise. APTs are usually mounted by well-funded attackers with very specific targets. To accomplish their goals, attackers orchestrating an APT typically introduce periods of delay among different stages of the attack, advance slowly while keeping their footprint low, and control the propagation of the attack through the use of human operators.

An APT is therefore a long-duration and stealthy security threat that characteristically unfolds in a multi-stage process, with a significant interval of time between stages. Other factors that may contribute to the "low-and-slow" execution that is typical of APTs include the use of low-bandwidth covert channels, a human-directed command-and-control center, and orchestration of multiple vectors of compromise, some of which may be physical, human, political or military. A given APT may therefore combine several distinct types of attacks, such as zero-day attacks (e.g., exploitation of unpatched software vulnerabilities) and advanced social engineering attacks.

Conventional defenses against APTs are often deployed in an ad-hoc manner, without a global understanding of attackers' goals and the objectives of the enterprise under attack. Defending against APTs is further complicated by the fact that an increasing number of enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used to build a variety of different types of virtual infrastructure, including cloud computing and storage systems, distributed across hundreds of interconnected physical computers and storage devices. Use of such cloud-based arrangements for at least a portion of the information technology infrastructure of a given enterprise can introduce additional challenges in defending the enterprise against APTs.

SUMMARY OF THE INVENTION

An illustrative embodiment of the present invention implements a graph-based approach to protection of a system comprising information technology infrastructure from an APT or other persistent security threat.

In one aspect, attack-escalation states of the persistent security threat to the information technology infrastructure of the system are assigned to respective nodes in a graph, and defensive costs for preventing transitions between pairs of the nodes are assigned to respective edges in the graph. A minimum cut of the graph is computed, and a defensive strategy is determined based on the minimum cut. The system comprising the information technology infrastructure subject to the persistent security threat is configured in accordance with the defensive strategy in order to deter the persistent security threat.

The above-noted illustrative embodiment advantageously overcomes one or more of the above-noted drawbacks of conventional approaches to defending against APTs. For example, this embodiment characterizes a particular APT as a graph having nodes that are given by respective attack-escalation states, with edges between the nodes being given by respective costs of defending the information technology infrastructure of the system from movement of the attack between corresponding pairs of nodes. Such arrangements can be used to identify accurately and efficiently an appropriate defensive strategy that takes into account the global goals of the attacker as well as the objectives of the enterprise under attack. This considerably facilitates defending against APTs and other types of persistent security threats, particularly in large-scale cloud systems that comprise distributed virtual infrastructure.

These and other features and advantages of illustrative embodiments of the present invention will become more readily apparent from the accompanying drawings and the following detailed description.

DETAILED DESCRIPTION

The present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising cloud computing or storage systems, as well as other types of processing systems comprising physical or virtual processing resources in any combination.

Figure 1:
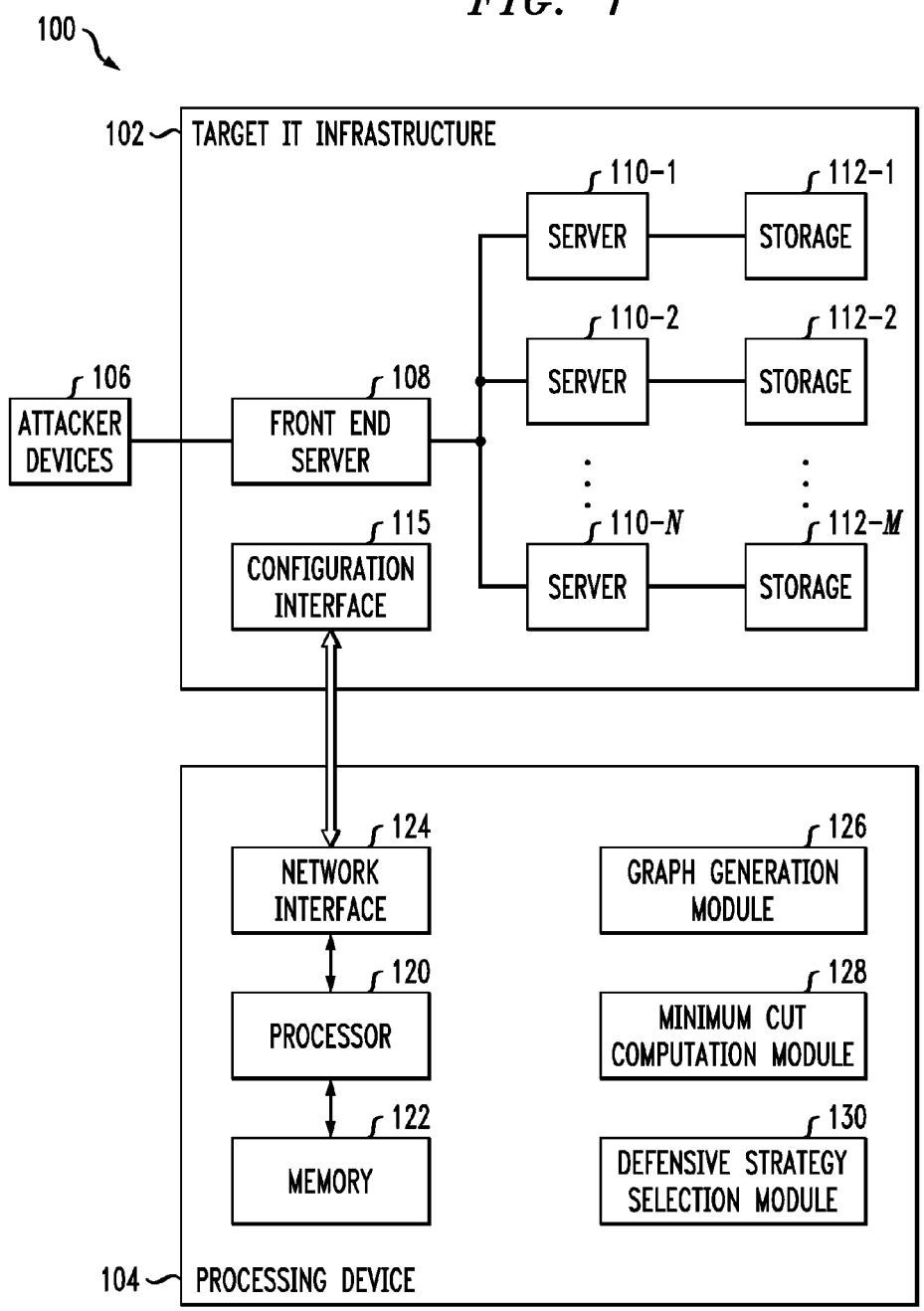
FIG. 1 is a block diagram of an information processing system that incorporates functionality for graph-based deterrence of persistent security threats in an illustrative embodiment of the invention.

FIG. 1 shows an information processing system 100 configured with functionality for graph-based deterrence of persistent security threats in an illustrative embodiment of the invention. The system 100 in this embodiment comprises target information technology (IT) infrastructure 102 that is coupled to an additional processing device 104, which may comprise a separate computer or server. The IT infrastructure 102 of system 100 is the target of an APT or other persistent security threat from an attacker associated with one or more attacker devices 106, which may also comprise computers, servers or other types of processing devices, in any combination. These attacker devices 106 in the present embodiment access the target IT infrastructure 102 via a front end server 108. The target IT infrastructure 102 further comprises a plurality of servers 110-1, 110-2, . . . 110-N coupled to the front end server 108, as well as a plurality of storage devices 112-1, 112-2, . . . 112-M, where N and M are arbitrary numbers. One or more of the servers 108 and 110 may comprise servers running web applications, such as, for example, file transfer protocol (FTP) servers, although a wide variety of other types of servers may be used.

The servers 108 and 110 and the storage devices 112 of IT infrastructure 102 may be viewed as examples of what are more generally referred to herein as "processing devices" and may collectively comprise one or more processing platforms in which processing devices are configured to communicate with one another over a network. Each such device generally comprises at least one processor and an associated memory, and implements one or more functional modules for controlling certain features of the information processing system 100. Multiple system elements may be implemented by a single processing device in a given embodiment.

The various servers and storage devices of the target IT infrastructure 102 may comprise, for example, cloud-based distributed infrastructure used to provide one or more services for an associated enterprise, including, but not limited to, Infrastructure as a Service (IAAS), Platform as a Service (PAAS), and Software as a Service (SAAS).

Such a distributed infrastructure may comprise a hypervisor platform and associated virtual processing and storage elements. An example of a commercially available hypervisor platform suitable for use in an embodiment of the invention is the VMware® vSphere™ which may include an associated management system such as vCenter™. The distributed infrastructure may further comprise one or more distributed processing platforms that include storage hardware products such as Celerra® and CLARiiON®, both commercially available from EMC Corporation of Hopkinton, Mass. A variety of other storage products, such as VNX and Symmetrix VMAX, both also from EMC Corporation, may be utilized to implement at least a portion of the target IT infrastructure 102.

The target IT infrastructure 102 may additionally or alternatively comprise a security information and event management (SIEM) system as described in U.S. patent application Ser. No. 12/982,288, filed Dec. 30, 2010 and entitled "Distributed Security Information and Event Management System with Application-Injected Remote Components," which is commonly assigned herewith and incorporated by reference herein. The techniques disclosed therein can be used to enhance the functionality of a centralized SIEM system such as the enVision® platform commercially available from RSA, The Security Division of EMC Corporation.

The processing device 104 communicates with the target IT infrastructure 102 via a configuration interface 115. Although shown in the figure as being separate from the target IT infrastructure 102 of the system 100, in other embodiments the processing device may be implemented within the target IT infrastructure.

The processing device 104 in the present embodiment comprises a processor 120 coupled to a memory 122. The processor 120 may comprise a microprocessor, a microcontroller, an application-specific integrated circuit (ASIC), a field programmable gate array (FPGA) or other type of processing circuitry, as well as portions or combinations of such circuitry elements. The memory 122 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by processing device 104 causes the device to perform functions associated with graph-based deterrence of persistent security threats to the IT infrastructure 102. One skilled in the art would be readily able to implement such software given the teachings provided herein. Other examples of computer program products embodying aspects of the invention may include, for example, optical or magnetic disks.

Also included in the processing device 104 is network interface circuitry 124, which is used to interface the processing device with the target IT infrastructure 102 via configuration interface 115. Such network interface circuitry may comprise conventional transceivers of a type well known in the art.

The processing device 104 further comprises a number of functional modules utilized to deter APTs or other persistent security threats to the IT infrastructure 102, including a graph generation module 126 which forms a graph that is representative of a particular persistent security threat, a minimum cut computation module 128 which computes a minimum cut of the graph, and a defensive strategy selection module 130 that determines an appropriate defensive strategy for protecting the IT infrastructure 102 against the persistent security threat based on a computed minimum cut. The selected defensive strategy is utilized to configure the IT infrastructure via its configuration interface 115. For example, the selected defensive strategy may control various adjustable security processes and parameters of the IT infrastructure via the configuration interface 115.

It should be noted that this particular set of modules 126, 128 and 130 for implementing the graph-based persistent security threat deterrence functionality of the system 100 is presented by way of example, and in other embodiments additional or alternative modules may be used. Also, the functionality associated with these particular modules in the FIG. 1 embodiment may be combined into a smaller set of functional modules or separated into a larger set of functional modules in other embodiments.

One or more of the modules 126, 128 and 130 of the processing device 104 may be implemented at least in part in the form of software that is stored by memory 122 and executed by processor 120. Accordingly, such modules need not be separate from the processor and memory elements as is illustratively shown in FIG. 2.

It should also be understood that a given embodiment of the system 100 may include multiple instances of the elements 102, 104 and 106, although only single instances of such elements are shown in the system diagram for clarity and simplicity of illustration. For example, separate instances of processing device 104 with graph-based persistent threat deterrence functionality may be provided for different portions of the IT infrastructure 102, or for each of a plurality of different instances of such IT infrastructure.

In addition, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

It is therefore to be appreciated that the particular arrangement of system elements shown in FIG. 1 is presented by way of illustrative example only, and in other embodiments different arrangements of additional or alternative elements may be used. Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices. For example, the IT infrastructure 102 and additional processing device 104 may each run on a separate processing platform, or portions of such elements may run on the same platform.

The operation of the information processing system 100 will now be described in greater detail with reference to the flow diagram of FIG. 2 and the example graph-based models of FIGS. 3 and 4.

Figure 2:
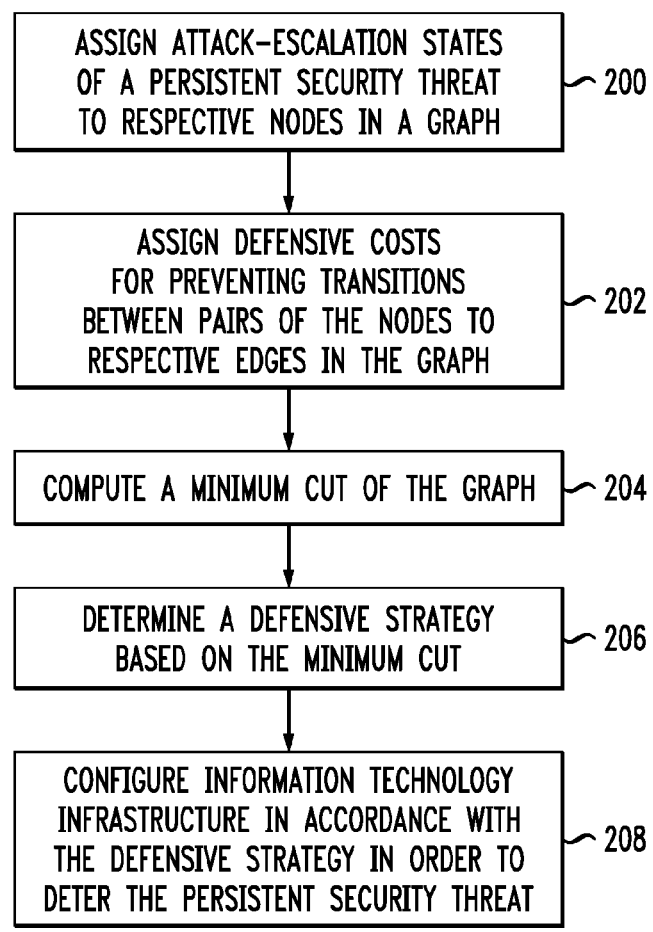
FIG. 2 is a flow diagram of a process for graph-based deterrence of persistent security threats in the system of FIG. 1.

Referring initially to FIG. 2, a process is shown for graph-based deterrence of persistent security threats in the information processing system 100. The process includes steps 200 through 208 as shown, and these steps in the present embodiment are implemented primarily by the processing device 104, although in other embodiments one or more such steps may be implemented by other system elements, or by the processing device 104 operating in conjunction with another system element, such as a component of the IT infrastructure 102.

In step 200, attack-escalation states of an APT or other persistent security threat are assigned to respective nodes in a graph. For example, initial and final attack-escalation states may be assigned to respective source and target nodes in the graph, and then additional attack-escalation states may be assigned to respective additional nodes of the graph between the source and target nodes. The initial attack-escalation state may comprise a state in which there is no compromise of the system, and the final attack-escalation state may comprise a state in which a specified system resource is compromised.

In step 202, defensive costs for preventing transitions between pairs of the nodes are assigned to respective edges in the graph. Each of the assigned defensive costs may be associated with the implementation of a particular defense for preventing transition between a given pair of nodes of the graph.

Steps 200 and 202 collectively result in the generation of a graph characterizing the attack-escalation states of the persistent security threat as well as defenses for preventing movement from node to node within the graph. The graph in the FIG. 1 embodiment is generated by the graph generation module 126 of processing device 104.

The graph generation process may involve processes such as identifying the resources of the enterprise that require maximum protection, defining the attack-escalation state space of the attacker, and determining the costs associated with defending against movement from state to state in the state space of the attacker.

The resulting graph models the persistent security threat by the attacker against the enterprise. The source node of the graph may be viewed as denoting the state of the system at the initiation of the attack (e.g., "system is not compromised"), and the target node may be viewed as denoting the final goal of the attacker (e.g., "sensitive information is exfiltrated"). The graph is a directed graph and edges between nodes represent attack vectors that advance the attack to the next escalation state. The defensive costs assigned to respective edges represent the costs for defending those edges against the advancing attack.

The goal of the attacker is to advance in the graph starting from the source node, and get to the target node without being detected. The goal of the enterprise acting as defender against the attack is to deploy the appropriate defenses along particular edges in the graph, with each such defense removing one or more edges, in order to protect its valuable resources by preventing the attacker from reaching the target node. The action space of both the attacker and the defender may be constrained by respective limited budgets.

Figure 3:
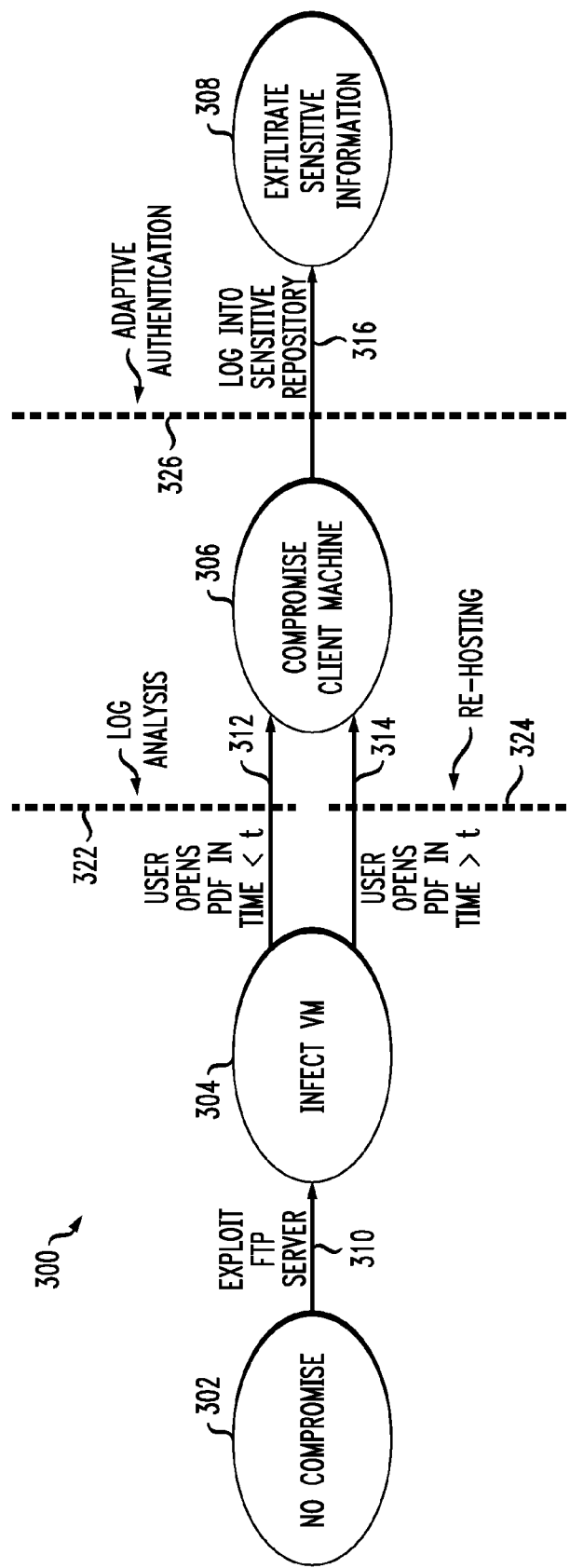
FIGS. 3 and 4 show examples of graphs used to model persistent security threats in the system of FIG. 1.

An example graph 300 that may result from performance of steps 200 and 202 is shown in FIG. 3. In this example, the graph includes four nodes 302, 304, 306 and 308. Nodes 302 and 308 are the respective source and target nodes, and correspond to respective initial and final attack-escalation states of the persistent security threat. More specifically, in this example, the initial attack-escalation state assigned to source node 302 is a "no compromise" state, and the final attack-escalation state assigned to target node 308 is a state in which designated sensitive information is extracted or "exfiltrated" from the system. The additional attack-escalation states in this example comprise an "infect virtual machine" state assigned to node 304 and a "compromise client machine" state assigned to node 306.

In the persistent security threat characterized by the example graph 300 of FIG. 3, the goal of the attacker is to exfiltrate sensitive information on a continuous basis from a sensitive repository inside the target IT infrastructure 102. For this purpose, the attacker initially exploits a front end virtualized FTP server, which may correspond to front end server 108 of FIG. 1. In conjunction with this server exploitation, the attacker inserts a malformed portable document format (PDF) file into the FTP server, resulting in infection of the virtual machine (VM) that implements that server. This takes the attack from the "no compromise" state assigned to node 302 to the "infect virtual machine state" assigned to node 304. The attack is next advanced by an internal enterprise user opening the malformed PDF file, an action that causes the corresponding client machine to be compromised, moving the attack from the "infect virtual machine" state assigned to node 304 to the "compromise client machine" state assigned to node 306. Once the attacker has been able to compromise the client machine, it tries to log in to the repository storing the sensitive information it wants to exfiltrate, and when successful advances the attack from the "compromise client machine" state assigned to node 306 to the "exfiltrate sensitive information" state assigned to node 308. As indicated above, the goal of the attacker in this particular persistent security threat is to remain persistent in the system 100, and to continue to successfully exfiltrate sensitive information.

In accordance with the above-described persistent security threat, source node 302 is shown in the graph 300 as being connected to node 304 by an "exploit FTP server" edge 310. Intermediate nodes 304 and 306 of the graph 300 are connected to one another by two parallel edges 312 and 314, with edge 312 being associated with a user opening a PDF file at a time that is less than a designated time t after the FTP server exploitation and edge 314 being associated with a user opening a PDF file at a time that is greater than the designated time t after the FTP server exploitation. In addition, the node 306 is connected to the target node 308 by an edge 316 associated with logging into a sensitive repository.

At least a subset of the edges 310, 312, 314 and 316 are assumed to have defensive costs assigned thereto in step 202, although such costs are not explicitly shown in the graph 300. These costs reflect the relative difficulties associated with preventing the attacker from advancing along the respective edges between pairs of nodes in the graph. In the present example, the costs associated with preventing transitions along edges 312, 314 and 316 include the costs associated with implementing a log analysis defense 322, a re-hosting defense 324 and an adaptive authentication defense 326, each of which will be described in greater detail below.

Defensive costs may also be assigned to the edge 310, although no particular defense is indicated in the figure for preventing exploitation of the FTP server by an attacker attempting to escalate the attack from the "no compromise" state assigned to node 302 to the "infect virtual machine" state assigned to node 304. However, it should be noted that this defensive cost would typically be quite large, as there are many possible FPT exploits. For instance, one can view the cost to protect against a zero-day exploit as potentially infinite, since there is no patch available. In determining the minimum cut of the graph, costs are assigned to all edges of the graph, so for edges such as edge 310, an infinite cost may be assigned. This will ensure that these edges will not be selected as part of the minimum cut of the graph.

The log analysis defense 322 may involve an analysis of event logs to determine correlation among certain events and thereby facilitate attack detection. This defense assumes that the defending enterprise logs all relevant system events (e.g., FTP commands, user accesses to file systems, etc.) and also that the resulting log is tamper proof (i.e., the attacker cannot remove events from the log after compromising a machine). With these assumptions, the log analysis defense can detect a time correlation between the events "malformed PDF file is inserted into the FTP server" and "user opens the malformed PDF file" if those two events occur sufficiently close to one another in time. In effect, the log analysis defense 322 removes the edge 312 associated with the user opening the PDF file at a time that is less than the designated time t after the FTP server exploitation.

The re-hosting defense 324 ensures that the virtual machines running the FTP service are refreshed periodically from a trusted image after each time interval of duration t. This removes the malformed PDF file from the exploited FTP server after time t, and thus limits the window of opportunity for the attacker to the time interval of duration t after the FTP server exploitation. In effect, the re-hosting defense 324 removes the edge 314 associated with the user opening the PDF file at a time that is greater than the designated time t after the server exploitation.

The log analysis defense 322 and re-hosting defense 324 therefore operate in combination with one another to eliminate the edges 312 and 314 and thereby prevent the attack from advancing from node 304 to node 306.

The adaptive authentication defense 326 with high probability prevents the attacker from accessing the sensitive repository. Adaptive authentication may require, for example, multiple-factor authentication (e.g., answers to life questions, display of SMS messages, etc.) in cases in which the contextual information (e.g., machine, location or time of the day) when the user attempts to log in does not match the expected user profile. In the FIG. 3 example, the adaptive authentication defense in effect removes the edge 316 associated with logging into the sensitive repository, as it is very unlikely that the attacker compromises both a client machine and user credentials that are typically utilized together to access the sensitive repository. The adaptive authentication defense may be implemented at least in part utilizing an authentication manager such as Authentication Manager Express, commercially available from RSA, The Security Division of EMC Corporation.

It is apparent from the foregoing that each of the defenses 322, 324 and 326 in the FIG. 3 example has associated costs, and as indicated in step 202 those costs are assigned to the corresponding edges 312, 314 and 316. The defensive costs associated with the edges 312, 314 and 316 in the FIG. 3 example will generally depend on the cost of deployment of the corresponding defenses 322, 324 and 326. For example, the log analysis defense 322 will typically require deployment of analytics for finding correlations in system logs, and the re-hosting defense 324 will typically require changes to existing services and incurs maintenance costs as well as slow-downs due to virtualization.

In step 204, a minimum cut of the graph is computed. This computation can be performed using any of a number of different known minimum cut algorithms, such as the Edmonds-Karp algorithm. A minimum cut of a directed graph is typically defined as the number of edges of total minimum cost that have to be removed so that there is no path in the graph from the source node to the target node. The minimum cut therefore identifies the set of one or more edges that if removed from the graph or "cut" will prevent the attacker from proceeding from the source node to the target node.

In the example of FIG. 3, the options for preventing the attacker from escalating the attack from source node 302 to target node 308 include a cut of edge 310, a cut of both edges 312 and 314, or a cut of edge 316. A given edge is cut in the present embodiment by providing an associated defense that serves to remove the edge from the graph. Thus, for example, implementation of log analysis defense 322 and re-hosting defense 324 will serve to cut edges 312 and 314, respectively, and implementation of adaptive authentication defense 326 will serve to cut edge 316. The computation of the minimum cut in step 204 will identify those edges of the graph that if removed will prevent the attacker from advancing to the target node at the lowest defensive costs. The minimum cut computation is performed in the FIG. 1 embodiment by module 128 of processing device 104.

In step 206, a defensive strategy is determined based on the minimum cut of the graph 300. The defensive strategy determined in this step may specify, for example, implementation of the various defenses that were associated with the defensive costs assigned to the respective edges that are removed from the graph by the minimum cut. More particularly, we have determined that an optimal defensive strategy for the enterprise in certain embodiments of the invention is to deploy the defenses along the minimum cut of the graph within the constrained budget. Selection from among multiple available defensive strategies based on the minimum cut may be implemented in the FIG. 1 embodiment by defensive strategy selection module 130.

In step 208, the target IT infrastructure 102 is configured in accordance with the defensive strategy determined in step 206, in order to deter the persistent security threat. Such configuration may occur by transmitting information specifying the selected defensive strategy from the processing device 104 to the target IT infrastructure 102 over a network connection between elements 124 and 115 under the control of the processor 120. The target IT infrastructure is then configured based on the transmitted information so as to implement the various defenses associated with the selected defensive strategy.

Advantageously, the illustrative process of FIG. 2 can be used to identify accurately and efficiently an appropriate defensive strategy that takes into account the global goals of the attacker as well as the objectives of the enterprise under attack. This considerably facilitates defending against APTs and other types of persistent security threats, particularly in large-scale cloud systems that comprise distributed virtual infrastructure.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementation of graph-based deterrence of persistent security threats. For example, the ordering of the process steps may be varied in other embodiments, or certain steps may be performed concurrently with one another rather than serially. Also, additional or alternative process steps may be used.

It is also to be appreciated that some defensive measures might only remove an edge of the graph with a certain probability. For instance, in the example of FIG. 3, the adaptive authentication defense might represent a cut of smaller cost than the log analysis and re-hosting defenses combined, but it may have only a certain probability of being effective. Accordingly, defenses may be selected not only based on their cost, but also on their expected effectiveness.

As indicated previously, functionality such as that described in conjunction with the flow diagram of FIG. 2 can be implemented at least in part in the form of one or more software programs stored in memory and executed by a processor of a processing device such as a computer or server. A memory having such program code embodied therein is an example of what is more generally referred to herein as a "computer program product."

The FIG. 3 example graph 300 is simplified in order to illustrate features of one possible embodiment of the invention, and more complex graphs may be generated and utilized to determine defensive strategies in other embodiments.

Figure 4:
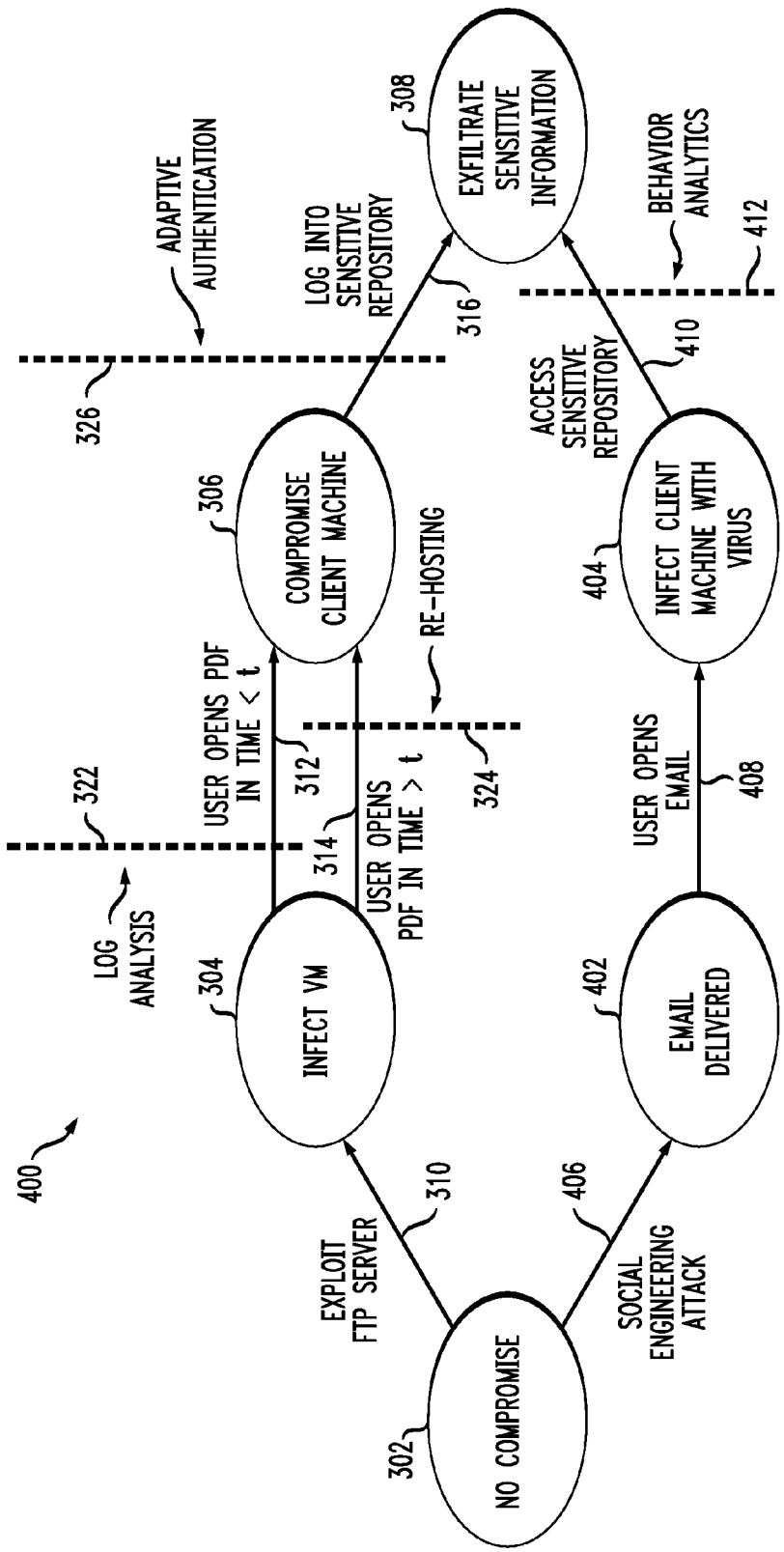

Another example graph 400 which incorporates additional attack-escalation states relative to the FIG. 3 example is shown in FIG. 4. The graph 400 includes the nodes 302, 304, 306 and 308 and edges 310, 312, 314 and 316 as previously described, but incorporates additional nodes 402 and 404 that are assigned to respective "email delivered" and "infect client machine with virus" attack-escalation states. These nodes 402 and 404 are connected to one another and to other nodes of the graph by one or more additional edges 406, 408 and 410 which correspond to attack state space transitions denoted "social engineering attack," "user opens email" and "access sensitive repository," respectively. In this example, a behavior analytics defense 412 may be used to cut the edge 410 so as to prevent movement of the attacker from node 404 to target node 308. Again, the graph 400 is a relatively simple example, and significantly more complex graphs may be generated and subject to minimum cut analysis using the techniques disclosed herein.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations, graph processing arrangements, and persistent security threats. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
assigning attack-escalation states of a persistent security threat to respective nodes in a graph, wherein assigning attack-escalation states of the persistent security threat to respective nodes in the graph comprises assigning initial and final attack-escalation states to respective source and target nodes in the graph;
assigning defensive costs to respective edges in the graph for preventing transitions between pairs of the nodes, wherein the defensive costs represent costs for preventing respective attack actions;
computing a minimum cut of the graph to identify a set of one or more edges that if removed from the graph will prevent the persistent security threat from proceeding from the source node to the target node; and
determining a defensive strategy based on the minimum cut;
wherein a system comprising information technology infrastructure subject to the persistent security threat is configured in accordance with the defensive strategy in order to deter the persistent security threat; and
wherein the steps are performed by a processing device comprising a processor coupled to a memory.

2. The method of claim 1 wherein the step of assigning attack-escalation states of the persistent security threat to respective nodes of a graph further comprises
assigning additional attack-escalation states to respective additional nodes of the graph between the source and target nodes.

3. The method of claim 1 wherein the initial attack-escalation state comprises a state in which there is no compromise of the system.

4. The method of claim 1 wherein the final attack-escalation state comprises a state in which a specified system resource is compromised.

5. The method of claim 4 wherein the final attack-escalation state comprises a state in which designated sensitive information is extracted from the system.

6. The method of claim 2 wherein the additional attack-escalation states comprise an infect virtual machine state and a compromise client machine state.

7. The method of claim 6 wherein the nodes of the graph to which the respective infect virtual machine state and compromise client machine state are assigned are connected by at least one edge associated with opening an infected file at a particular time relative to a designated time after entry into the infect virtual machine state.

8. The method of claim 7 wherein the nodes of the graph to which the respective infect virtual machine state and compromise client machine state are assigned are connected by a first edge associated with opening an infected file at a time that is less than the designated time after entry into the infect virtual machine state and by a second edge associated with opening an infected file at a time that is greater than the designated time after entry into the infect virtual machine state.

9. The method of claim 8 wherein the defensive costs assigned to the first and second edges comprise costs of providing a log analysis defense and a re-hosting defense, respectively.

10. The method of claim 6 wherein the nodes of the graph to which the respective initial attack-escalation state and the infect virtual machine state are assigned are connected by at least one edge associated with exploitation of a server.

11. The method of claim 6 wherein the nodes of the graph to which the compromise client machine state and final attack-escalation state are assigned are connected by at least one edge associated with logging into a sensitive repository.

12. The method of claim 11 wherein the defensive costs assigned to the edge associated with logging into a sensitive repository includes costs of providing an adaptive authentication defense.

13. The method of claim 1 wherein the defensive costs assigned to respective edges of the graph are indicative of relative difficulties associated with preventing an attacker from advancing along the respective edges between pairs of nodes in the graph.

14. The method of claim 1 wherein the processing device is implemented within the information technology infrastructure of the system.

15. A computer program product comprising a non-transitory processor-readable storage medium having encoded therein executable code of one or more software programs, wherein the one or more software programs when executed by the processing device implement the steps of the method of claim 1.

16. An apparatus comprising:
at least one processing device comprising a processor coupled to a memory;
wherein the memory is configured to store information characterizing a graph in which attack-escalation states of a persistent security threat are assigned to respective nodes in the graph and defensive costs are assigned to respective edges in the graph for preventing transitions between pairs of the nodes;
wherein the attack-escalation states of the persistent security threat that are assigned to respective nodes in the graph comprise initial and final attack-escalation states assigned to respective source and target nodes in the graph;
wherein the defensive costs represent costs for preventing respective attack actions;
wherein the processing device under control of the processor is operative:
  to compute a minimum cut of the graph to identify a set of one or more edges that if removed from the graph will prevent the persistent security threat from proceeding from the source node to the target node; and
  to determine a defensive strategy based on the minimum cut; and
wherein a system comprising information technology infrastructure subject to the persistent security threat is configured in accordance with the defensive strategy in order to deter the persistent security threat.

17. The apparatus of claim 16 wherein the processing device is implemented within the information technology infrastructure of the system.

18. The apparatus of claim 16 wherein the information technology infrastructure comprises distributed virtual infrastructure of a cloud service provider.

19. An information processing system comprising:
information technology infrastructure subject to a persistent security threat; and
at least one processing device;
wherein the processing device is configured:
  to assign attack-escalation states of the persistent security threat to respective nodes in a graph, the assigned attack-escalations states comprising initial and final attack-escalation states assigned to respective source and target nodes in the graph;
  to assign defensive costs to respective edges in the graph for preventing transitions between pairs of the nodes, the defensive costs representing costs for preventing respective attack actions;
  to compute a minimum cut of the graph to identify a set of one or more edges that if removed from the graph will prevent the persistent security threat from proceeding from the source node to the target node; and
  to determine a defensive strategy based on the minimum cut; and
wherein the information technology infrastructure is configured in accordance with the defensive strategy in order to deter the persistent security threat.

20. The information processing system of claim 19 wherein the information technology infrastructure comprises at least one processing platform comprising a plurality of processing devices with each such processing device of the processing platform comprising a processor coupled to a memory.

* * * * *